US010942290B2

(12) United States Patent
Zhang et al.

(10) Patent No.: US 10,942,290 B2
(45) Date of Patent: Mar. 9, 2021

(54) X-RAY DETECTION SYSTEM AND METHOD

(71) Applicant: Nuctech Company Limited, Beijing (CN)

(72) Inventors: Li Zhang, Beijing (CN); Zhiqiang Chen, Beijing (CN); Yunda Sun, Beijing (CN); Xin Jin, Beijing (CN); Ming Chang, Beijing (CN); Xiaofei Xu, Beijing (CN)

(73) Assignee: Nuctech Company limited, Beijing (CN)

( * ) Notice: Subject to any disclaimer, the term of this patent is extended or adjusted under 35 U.S.C. 154(b) by 0 days.

(21) Appl. No.: 16/626,169

(22) PCT Filed: May 16, 2019

(86) PCT No.: PCT/CN2019/087221
§ 371 (c)(1),
(2) Date: Dec. 23, 2019

(87) PCT Pub. No.: WO2020/057157
PCT Pub. Date: Mar. 26, 2020

(65) Prior Publication Data
US 2020/0200941 A1 Jun. 25, 2020

(30) Foreign Application Priority Data
Sep. 18, 2018 (CN) .......................... 201811086635.2

(51) Int. Cl.
*G01N 23/20091* (2018.01)
*G01V 5/00* (2006.01)
(52) U.S. Cl.
CPC ................................. *G01V 5/0025* (2013.01)

(58) Field of Classification Search
CPC ..... G01N 23/20091; G01N 2223/3301; G01N 2223/1016; G01N 2223/316; G01N 23/02; G01N 33/0031; G01V 5/0025
See application file for complete search history.

(56) References Cited

U.S. PATENT DOCUMENTS 6,222,904 B1 4/2001 Berestov
2010/0061512 A1* 3/2010 Edic ........................ G01N 23/20
378/71
(Continued)

FOREIGN PATENT DOCUMENTS

CN 101501477 A 8/2009
CN 101512385 A 8/2009
(Continued)

OTHER PUBLICATIONS

"International Application No. PCT/CN2019/087221, International Search Report dated Jul. 29, 2019", (Jul. 29, 2019), 11 pgs.
(Continued)

*Primary Examiner* — David P Porta
*Assistant Examiner* — Fani Boosalis
(74) *Attorney, Agent, or Firm* — Schwegman Lundberg & Woessner, P.A.

(57) ABSTRACT

The present application discloses an X-ray detection system and method. The detection system includes: a beam source generator, first detectors, a second detector, a collimating device and a processor. The first detectors and the second detector are alternately arranged in a transmission direction of an object to be detected. The beam source generator emits a plurality of columns of beam signals, wherein each column of beam signals comprises a plurality of beam signals; the first detectors receive a plurality of columns of transmitted beam signals passing through the object; the collimating device performs a specificity selection from a plurality of columns of scattered beam signals passing through the (Continued)

object; the second detector receives scattered beam signals selected by the collimating device; and the processor determines a detection result of the object according to the plurality of columns of transmitted beam signals and the selected scattered beam signals.

14 Claims, 6 Drawing Sheets

(56) References Cited

U.S. PATENT DOCUMENTS

2011/0188632 A1* 8/2011 Harding ............... G01V 5/0016
378/86
2017/0176352 A1 6/2017 Chen et al.

FOREIGN PATENT DOCUMENTS

| CN | 106896120 A | 6/2017 |
| CN | 106896121 A | 6/2017 |
| EP | 3182175 A1 | 6/2017 |
| JP | 2007508561 A | 4/2007 |
| JP | 2010060572 A | 3/2010 |
| WO | WO-2011097386 A1 | 8/2011 |

OTHER PUBLICATIONS

"European Application No. 19765147.4, Extended European Search Report dated Nov. 2, 2020", (Nov. 2, 2020), 7 pgs.
"Japanese Application No. 2019-545792, Office Action dated Dec. 22, 2020", (Dec. 22, 2020), 4 pgs.

* cited by examiner

US 10,942,290 B2

X-RAY DETECTION SYSTEM AND METHOD

CROSS-REFERENCE TO RELATED APPLICATIONS

The present application is a National Stage of International Application No. PCT/CN2019/087221, filed on May 16, 2019, which claims priority to Chinese Patent Application No. 201811086635.2, filed on Sep. 18, 2018 and titled with "X-RAY DETECTION SYSTEM AND METHOD", both of which are incorporated herein by reference in their entireties.

TECHNICAL FIELD

The present application relates to the field of X-ray detection, and in particular to an X-ray detection system and method.

BACKGROUND

Accurate detection of contraband is a key point but also a difficult point in public security check. Conventional transmission imaging technologies have a limitation that it cannot provide molecular structure information. X-ray diffraction (XRD) technology is able to provide structural information in a molecular level of a substance and has a stronger specificity, so can be used for identifying a substance by detecting a diffraction spectrum of the substance. Conventional XRD detection systems generally includes: a beam source, detectors and a collimation system. Using the XRD technology to detect contraband, it is possible to compensate for deficiencies of other conventional technologies and help to improve identification accuracy.

However, conventional detection systems have problems such as low collection efficiency for scattered beam signals.

SUMMARY

The embodiments of the present application provides an X-ray detection system, which can improve collection efficiency for scattered beam signals, thereby detection efficiency of the detection system can be improved.

According to a first aspect of the present application, there is provided an X-ray detection system. The detection system includes:

a beam source generator, first detectors, a second detector, a collimating device and a processor;

wherein the first detectors and the second detectors are alternately arranged in a transmission direction of an object to be detected; and wherein the beam source generator is configured to emit a plurality of columns of beam signals, wherein each column of beam signals comprises a plurality of beam signals;

the first detectors are configured to receive a plurality of columns of transmitted beam signals passing through the object;

the collimating device is configured to perform a specificity selection from a plurality of columns of scattered beam signals passing through the object;

the second detector is configured to receive scattered beam signals selected by the collimating device; and the processor is configured to determine a detection result of the object according to the plurality of columns of transmitted beam signals and the selected scattered beam signals.

According to a second aspect of the present application, there is provided an X-ray detection method. The detection method includes:

emitting, by a beam source generator, a plurality of columns of beam signals, wherein each column of beam signals includes a plurality of beam signals;

receiving, by first detectors, a plurality of columns of transmitted beam signals passing through an object to be detected;

performing, by a collimating device, a specificity selection from a plurality of columns of scattered beam signals passing through the object;

receiving, by a second detector, scattered beam signals selected by the collimating device;

and determining, by a processor, a detection result of the object according to the plurality of columns of transmitted beam signals and the selected scattered beam signals.

According to the detection system and method in the embodiments of the present application, since a plurality of columns of beam signals are used and the first detectors and the second detectors are alternately arranged in the transmission direction of the object to be detected, the number of photons collected in a time unit from scattered beam signals is greatly increased, and thus collection efficiency for scattered beam signals is improved.

BRIEF DESCRIPTION OF THE DRAWINGS

Other features, objects and advantages of the present application will become apparent from the following detailed description of non-limiting embodiments in conjunction with the appended drawings, in which the same or like reference signs denote the same or like features.

DETAILED DESCRIPTION

Figure 1:
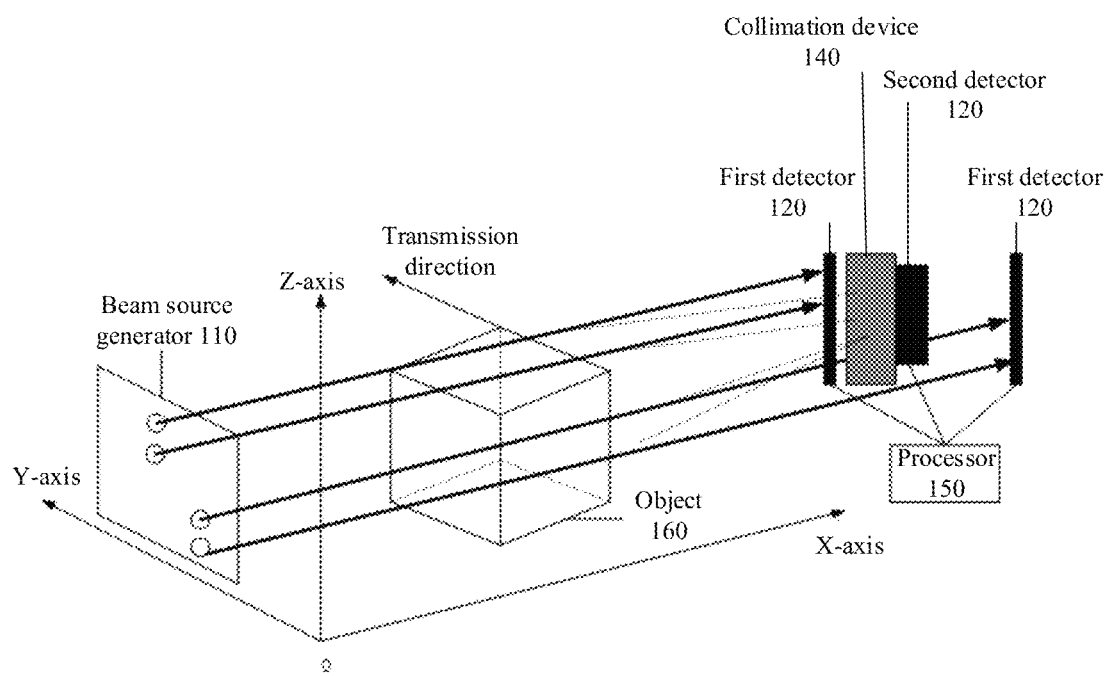
FIG. 1 is a schematic view showing a structural of an X-ray detection system in an embodiments of the present application.

Features and exemplary embodiments of various aspects of the present application are described in detail below. In the following detailed description, numerous specific details are set forth. However, it will be apparent to those skilled in the art that the present application may be practiced without some of the details. The following description of the embodiments is merely provided to provide a better understanding of the present application. In the drawings and the following description, at least some of common structures and techniques are not shown in order to avoid unnecessary obscuring of the present application. Further, for clarity, the dimensions of some of the structures may be exaggerated. The same reference signs in the drawings denote the same or similar structures, and thus their detailed description will be omitted. Furthermore, the features, structures, or characteristics described hereinafter may be combined in any suitable manner in one or more embodiments.

There are many types of detection systems available today, which generally include: a beam source generator, detectors, and a collimation system. In selection of the beam source generator, X-rays obtained by bremsstrahlung (that is, an X-ray energy spectrum having a wide energy distribution) generated through bombardment of electron beams onto a target are generally used. In selection of the detectors, a photon counting detector or an energy integration detector may be used, wherein the photon counting detector can distinguish energies of photons, while the energy integration detector cannot distinguish energies of photons. Since it requires to detect an X-ray diffraction spectrum, it is necessary to match corresponding detectors. The energy integration detector must perform filtering in an X-ray energy dimension of the beam source generator, while the photon counting detector does not require restrictions on the beam source generator of the X-rays. Since spatial distribution of physical processes of scatterings is relatively smooth, it is easy to causing aliasing of different reconstructed pixel information in a same detector pixel. In order to ensure a solution, the collimation device is added to filter out unnecessary signals, reduce aliasing and improve solution stability. Conventional collimation device mainly include a long straight collimator and an encoder plate. The long straight collimator constrains X-rays in two dimensions, while the encoder plate constrains X-rays in one dimension.

However, although the conventional detection system can detect diffraction information at a certain pixel point, it requires too long imaging time to be practically applied. In addition, a photon counting detector may be used to improve collection efficiency for scattered beam signals, but there is still a problem that it requires too long scanning time to be practically applied. An energy integration detector and the encoder plate may be used to increase flux of scattered beam signals, it requires a filtering process in an energy dimension of the beam source generator, thereby reducing utilization efficiency of photons.

The embodiments of the present application is an improvement based on the above problems.

For a better understanding of the present application, the detection system and method according to embodiments of the present application will be described in detail below with reference to the accompanying drawings. It should be noted that these embodiments are not intended to limit the scope of the disclosure.

FIG. 1 is a schematic view showing a structure of an X-ray detection system according to an embodiment of the present application.

As shown in FIG. 1, the X-ray detection system in the embodiment includes a beam source generator 110, first detectors 120, a second detector 130, a collimation device 140, and a processor 150.

The first detectors 120 and the second detector 130 are alternately arranged in a transmission direction of an object 160 to be detected.

The beam source generator 110 is configured to emit a plurality of columns of beam signals, and each column of beam signals includes a plurality of beam signals.

The first detectors 120 are configured to receive a plurality of transmitted beam signals passing through the object 160.

The collimation device 140 is configured to perform specificity selection from a plurality of scattered beam signals passing through the object 160.

The second detector 130 is configured to receive scattered beam signals selected by the collimation device 140.

The processor 150 is configured to determine a detection result of the object 160 according to the plurality of columns of transmitted beam signals and the selected scattered beam signals.

As can be seen from FIG. 1, emission of the beam signals by the beam source generator 110 is in a positive direction of an X-axis of a three-dimensional Cartesian coordinate system, and the transmission direction of the object 160 is in a Y axis of three-dimensional Cartesian coordinate system. The beam source generator 110 generates a plurality of columns of beam signals, which then pass through the object 160. Transmitted beam signals are received by the first detectors 120, and scattered beam signals are firstly passed to the collimation device 140 for specificity selection and then selected scattered beam signals are received by the second detector 130. The transmitted beam signals and the scattered beam signals are processed by the processor 150 to determine a detection result of the object.

With the embodiment of the present application, since a plurality of columns of beam signals are used and the first detectors 120 and the second detectors 130 are alternately arranged in the transmission direction of the object 160, the number of photons collected in a time unit from scattered beam signals is greatly increased, and thus collection efficiency for scattered beam signals is improved.

Figure 2:
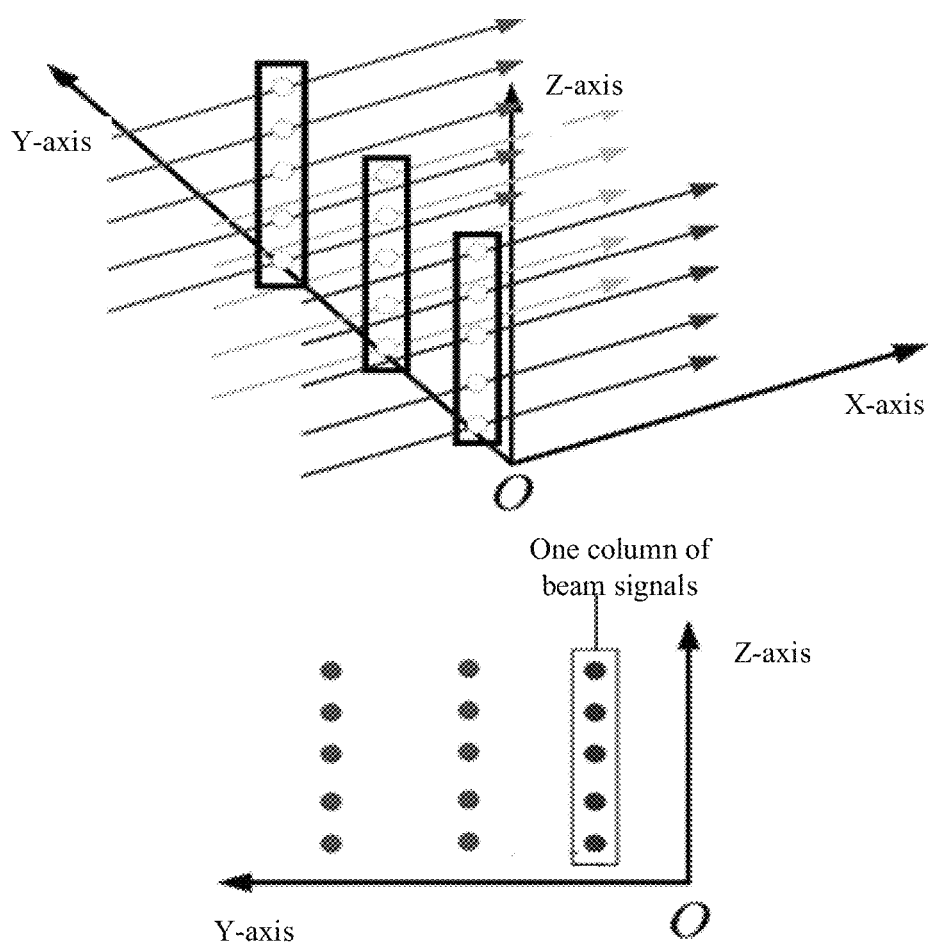
FIG. 2 is a schematic view showing a plane of incidence points of beam signals from a beam source generator in an embodiment of the present application.

FIG. 2 is a schematic view showing a plane of incidence points of beam signals from a beam source generator according to an embodiment of the present application.

In an embodiment, an incident plane of the plurality of columns of beam signals is in a YOZ plane, and incident points thereof on the YOZ plane are in a two-dimensional discrete distribution. Specifically, the incident points of the plurality of columns of beam signals are spaced equally on a Z-axis of the three-dimensional Cartesian coordinate system and are spaced on the Y-axis either equally or unequally. Specifically, straight lines formed by the incident points of the plurality of columns of beam signals are in parallel to the Z axis.

It should be understood that, as shown in FIG. 2, the beam signals are incident along the X-axis, and in the YOZ plane, the incident points are in a two-dimensional discrete distribution. The straight lines formed by the incident points of the plurality of columns of beam signals are in parallel to the Z axis, and the incident points are spaced equally in the Z-axis direction. The incident points may be spaced in the Y-axis direction either equally or unequally. If they are equally spaced in the Y-axis direction, the received scattered beam signals can be used for a periodic detection. If they are unequally spaced in the Y-axis direction, it can be ensured that the second detector 130 can reuse previously received scattered beam signals during the object 160 is in movement. Therefore, the detection system in the embodiment of the present application not only improves reception efficiency for scattered beam signals, but also ensures an accurate solution with respect to the object 160.

In an embodiment, an interval is a distance determined based on a transmission speed of the object, exposure time of the first detectors and exposure time of the second detector.

It should be understood that spatial sampling intervals (p, Q, r) for scattered beam signals of the object may be assumed to respectively correspond to discrete distances in the three directions (X, Y, Z).

The Q may be formulated as follows (1):

$$Q = v \times T \tag{1}$$

where v is the transmission speed of the object, and T is the exposure time of each of the first detectors 120 and the exposure time of the second detector 130.

It should be noted that the interval between different columns of beam signals in the Y-axis direction is L, which is an integral multiple of the Q. In the case of equal spacing in the Y-axis direction, the discrete spacing of the incident points in the Y-axis direction is the Q. The interval L satisfies the following relationship:

$$L = k \times Q \tag{2}$$

where k is an integer. In the case where k is a fixed value, arrangement of the beam signals is distributed along the transmission direction of the object 160 with equal intervals. In the case of periodic distribution with equal intervals, after k times of exposures since each detection of beam signals by the first detectors 120 and the second detector 130, the same beam signals are detected. Therefore, beam signals of a same reconstructed pixel point can be summed to improve reception efficiency of scattered beam signals and reduce noises, thereby realizing reuse of the beam signals.

In the case that k is not a fixed value, that is, the interval between columns of beam signals is not equal, beam signals received by the first detectors 120 and the second detector 130 at different times may form a linear equation group, which may be solved with limited by continuity constraints. This also can achieve reuse of the beam signals.

The equations used for solution in the embodiment of the present application is as follows.

The attenuation law of X-rays can be described by Beer's law:

$$I(E) = I_0(E) \exp(\int -\mu(E, x) dx) \tag{3}$$

where E denotes photon energy, $I_0(E)$ denotes incident energy spectrum, and I(E) denotes transmission energy spectrum.

$$\begin{cases} p_L = \int I_L(E) \exp\left(\int -\mu(E, x) dx\right) dE \\ p_H = \int I_H(E) \exp\left(\int -\mu(E, x) dx\right) dE \end{cases} \tag{4}$$

where $I_L(E)$ denotes low energy equivalent energy spectrum, $I_H(E)$ denotes high energy equivalent energy spectrum, and $p_L$ and $p_H$ denotes low energy detection signals and high energy detection signals, respectively.

The scattered X-ray beam signals can be described as:

$$I(E, \theta) = C I_0(E) T(E) f_{xrd}(E, \theta) \tag{5}$$

where C is a constant factor, and T(E) is an attenuation term of the object and is described as follows:

$$T(E) = \exp(\int -\mu(E, x) dx) \tag{6}$$

The beam signals detected by the second detector 130 is a summation of a plurality of scattered beam signals, and can be described as follows by discretization of the equation (6):

$$s(E, Y) = \Sigma_\Omega A(X, Y) I(E, \theta, X) \tag{7}$$

where Y denotes a pixel coordinate of the second detector 130, s(E, Y) denotes a detected energy spectrum of the second detector 130, $\Omega$ denotes a set of scattered beam signals that can be incident on the pixel Y, and A(X, Y) denotes effects of the encoder plate on the scattered beam signals.

In subsequent processes, the attenuation term T(E) of the substance to be detected is calculated according to correlation technique of the first detector 120, and an incident energy spectrum $I_0(E)$ of the beam signals may be obtained by software simulation. After correction of the attenuation term T(E) and the incident energy spectrum $I_0(E)$, the following equation (8) can be obtained:

$$S(q, Y) = \Sigma_\Omega A(X, Y) f_{xrd}(q, X) \tag{8}$$

where S(q,y) denotes corrected scattering spectrum, and q is a vector of scattered beam signals, which is a core variable of coherent scattered beam signals:

$$q = \frac{E \sin\left(\frac{\theta}{2}\right)}{hc} \tag{9}$$

where E denotes energy, c denotes speed of light, and h denotes a wavelength. The equation (8) is a physical model and solution core of a scattering field, which is a linear superposition model. Therefore, it can be solved using a solution algorithm such as ART.

A(X, Y) decides stability of solution of the equation, while S(q, Y) is closely related to noise level of the equation. A purpose of the embodiment of the present application is to improve the reception efficiency S(q, Y) of the scattered beam signals while ensuring stable solution.

For example, when detection is performed at the first time by using a first row of the second detectors 130:

$$S_{1,1}(q, Y) = \sum_{\Omega 1} A(X_1, Y) f_{xrd}(q, X_1) + \sum_{\Omega k+1} A(X_{k+1}, Y) f_{xrd}(q, X_{k+1}) \tag{10}$$

$$S_{1,2}(q, Y) = \sum_{\Omega 2} A(X_2, Y) f_{xrd}(q, X_2) + \sum_{\Omega k+2} A(X_{k+2}, Y) f_{xrd}(q, X_{k+2})$$

$$S_{2,k+1}(q, Y) = \sum_{\Omega 1} A(X_1, Y) f_{xrd}(q, X_1) + \sum_{\Omega k+1} A(X_{k+1}, Y) f_{xrd}(q, X_{k+1})$$

wherein, $S_{1,1}$ denotes a detection of the first row of second detectors 130 at the first time, in which the first subscript denotes the row number of the second detectors 130, and the second subscript denotes the number of detections. $X_k$ denotes scattered beam signals detected by the $k^{th}$ row. The fowling equation is satisfied because the arrangement is periodic.

$$S_{1,1}(q, Y) = S_{2,k+1}(q, Y) = S_{3,2k+1}(q, Y) = \ldots \tag{11}$$

The same detection signals described above are accumulated to increase count rate.

In the case that k is not a fixed value, that is, intervals between columns of beam sources are not equal, beam signals detected at different times may form a linear equation group, which may be solved with limited by continuity constraints. This also can achieve reuse of the beam signals. For example:

$$S_{1,u}(q, Y) = \sum_{\Omega 1} A(X_1, Y) f_{xrd}(q, X_1) + \sum_{\Omega 2} A(X_2, Y) f_{xrd}(q, X_2) \quad (12)$$

$$S_{2,v}(q, Y) = \sum_{\Omega 1} A(X_1, Y) f_{xrd}(q, X_1) + \sum_{\Omega 3} A(X_3, Y) f_{xrd}(q, X_3)$$

$$S_{3,w}(q, Y) = \sum_{\Omega 2} A(X_2, Y) f_{xrd}(q, 2) + \sum_{\Omega 3} A(X_3, Y) f_{xrd}(q, X_3)$$

Although the above equations cannot be superimposed to denoise, the purpose of reusing beam signals and reducing noise of beam signals can still be achieved due to an increased number of detection times.

By determining the interval based on transmission speed of the object, exposure time of the first detectors and exposure time of the second detector, reception efficiency for scattered beam signals can be improved, and while an accurate solution with respect to the object 160 is also ensured.

Figure 3:
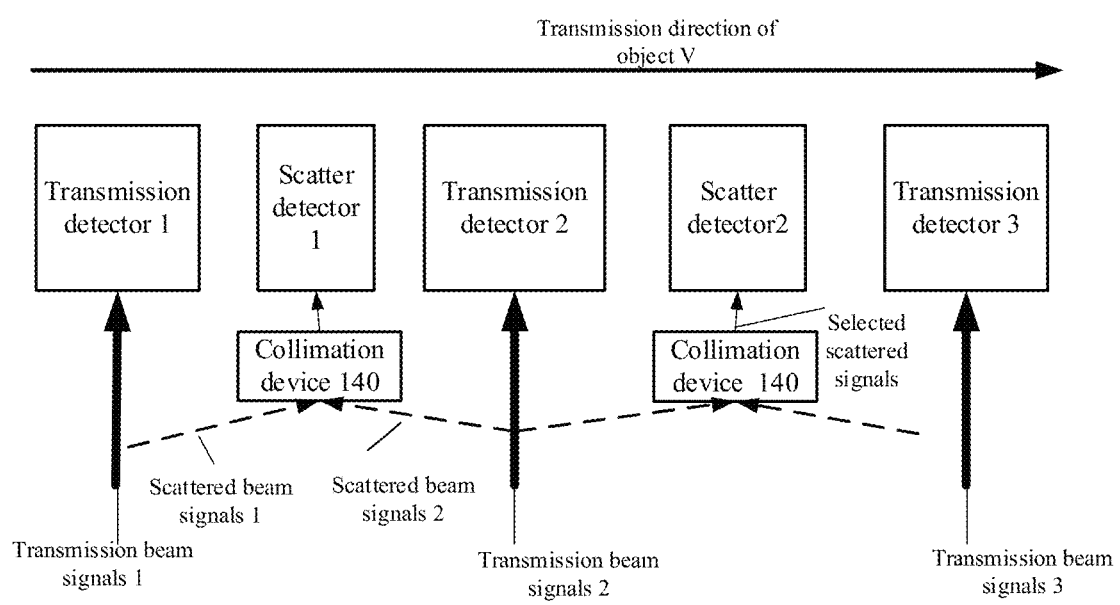
FIG. 3 is a schematic view showing arrangement of first detectors and second detectors in an embodiment of the present application.

FIG. 3 is a schematic view showing arrangement of the first detectors and the second detectors in an embodiment of the present application.

In an embodiment, in order to improve reception efficiency for scattered beam signals and minimize cost of the detection system, the first detectors 120 include: at least two dual energy transmission detectors, and the second detector 130 includes: at least one photon counting scatter detector.

It should be understood that, in addition to scattered beam signals of a single beam signal on a plurality of object points, the photon counting scatter detector can simultaneously receive scattered beam signals of different beam signals within a same column of beam signals, and scattered beam signals of different beam signals in different columns of beam signals. In addition, since a plurality of photon counting scatter detectors are arranged along the transmission direction of the object, detections of the plurality of columns of beam signals at multiple times may be summed, thereby increasing detection accuracy and improving detection efficiency.

As shown in FIG. 3, the dual-energy transmission detectors and the photon counting scattering detectors are alternately arranged along the transmission direction of the object. The dual energy transmission detectors receives a plurality of columns of transmitted beam signals after passing through the object. The photon counting scatter detectors receives scattered beam signals.

As can be seen in FIG. 3, the photon counting scatter detector 1 is capable of detecting scattered beam signal 1 of the column of beam signals 1, and the dual energy transmission detector 1 is capable of detecting transmitted beam signal 1 of the column of beam signal 1. Moreover, as can be seen in FIG. 3, the photon counting scatter detector 1 is capable of detecting scattered beam signal 2 of the column of beam signals 2, and the dual energy transmission detector 2 is capable of detecting transmitted beam signals 2 of the column of beam signals 2. Both of the two processes occur simultaneously. Since it is designed that the encoder plate corresponds to the photon counting scatter detector, the photon counting scatter detector 1 is limited to detect only the scattered beam signal 1 and the scattered beam signal 2. By alternate distribution, it is possible to detect the scattered beam signals generated by two adjacent columns of beam signals at the same time, utilization efficiency for detecting scattered beam signals by the photon counting scattering detector is improved. In the front of the photon counting scatter detector, the encoder plate is placed to improve stability during recovery of beam signals.

Figure 4:
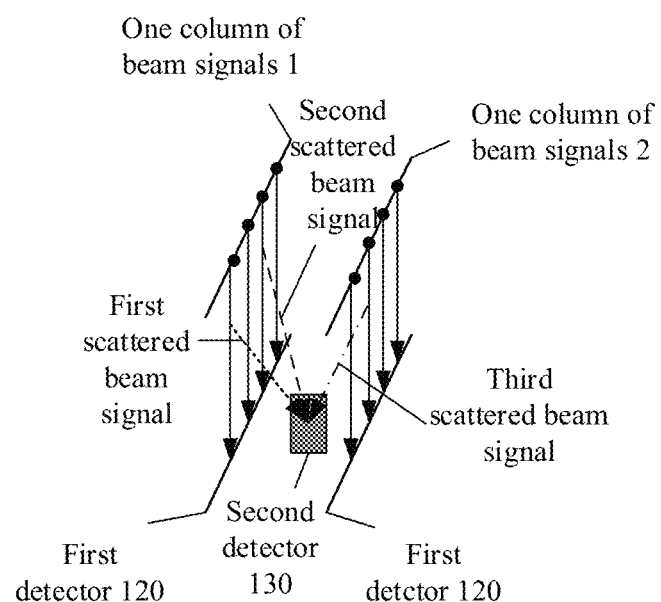
FIG. 4 is a schematic view showing scattering of beam signals in an embodiment of the present application.

FIG. 4 is a schematic diagram showing scattering of beam signals according to an embodiment of the present application.

As shown in FIG. 4, solid lines in FIG. 4 denote the transmitted beam signals, and broken lines denote scattered beam signals passing through the collimating device 140 and received by the second detector 130. It is illustrated that the first scattered beam signal is a scattered beam signal coming from different voxel points of a same beam signal, and the second scattered beam signal is a scattered beam signal coming from a different beam signal of the same column of beam signals, the third scattered beam signal is a scattered beam signal coming from a different column of beam signals. By alternately distributing the first detectors 120 and the second detectors 130, it is possible to simultaneously detect scattered beam signals generated by two adjacent columns of beam signals, and thus utilization efficiency for detecting scattered beam signals by the photon counting scattering detector is improved. In front of the photon counting scatter detector, the encoder plate is placed to improve the stability during the solution process.

Figure 5:
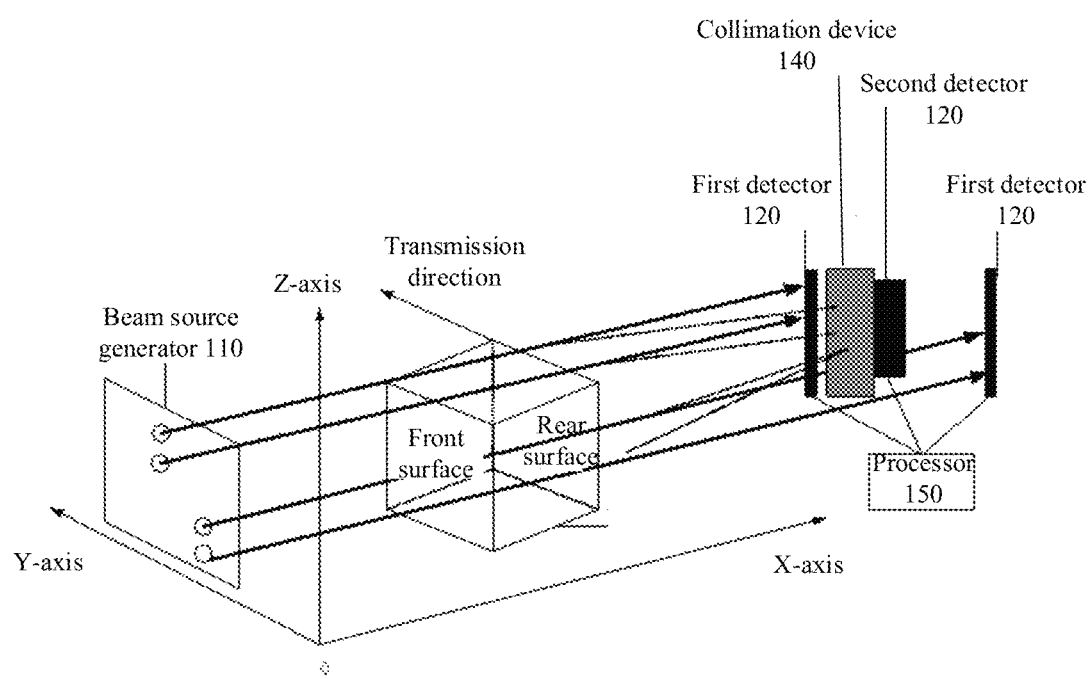
FIG. 5 is a schematic diagram showing a location of an object to be detected in an embodiment of the present application.

FIG. 5 is a schematic view showing location of an object to be detected in an embodiment of the present application.

The following are specific experimental examples.

The signals in embodiments of the present application have typical values of the detection system. An analysis implementation process with respect to a case where k is not a fixed value for the periodic distribution is similar to that with respect to the case where k is a fixed value.

For example, as shown in FIG. 5, the object to be detected has a height of 200 mm, its front surface is in a distance of 1200 mm from a plane where the first detectors 120 and the second detector 130 are located, its rear surface in a distance of 600 mm from a plane where the first detectors 120 and the second detector 130 are located. Due to limitation of the encoder plate/collimator, a scattered beam signal with a scattering angle of 3 degree is detected. Most of scattered beam signals are distributed in a range from 30 mm to 60 mm from both sides of the first detector 120. The distance between every two adjacent first detectors 120 is 90 mm. A total of 10 columns of beam signals are emitted. Correspondingly, the first detectors 120 are spaced with an interval L of 90 mm, and each second detector 130 is distributed at a middle location between two adjacent first detectors 120. The second detector has width of 30 mm to ensure collection of most of required scattered photons.

Since it is required that reconstruction accuracy of spatially scattered beam signals from an object to be detected is 10 mm×10 mm×10 mm, p=Q=r=10 mm. It is possible that each of columns of beam signals includes 20 beam signals and the factor k=9. In this case, a column of beam signals in each XOZ plane will be re-detected after 9 times of detections, which satisfies basic requirements for reuse of detectors. Thus, the required time is only 1/10 of the conventional case in order to attain detection results with the same Signal to Noise ratio. Since the first detectors 120 are spaced apart from the second detector 130, the second detectors 130 at both of left and right sides are able to perform detection symmetrically for one column of beam signals. As compared with the case there the second detector 130 is disposed at one side, the required time is further reduced by ½. Since each of columns of beam signals includes 20 beam signals, it results in a 20-fold increase in efficiency.

With the above discussed detection system, detection time can be greatly reduced, and detection efficiency can be improved.

The method according to an embodiment of the present application will be described in detail below with reference to the accompanying drawings.

Figure 6:
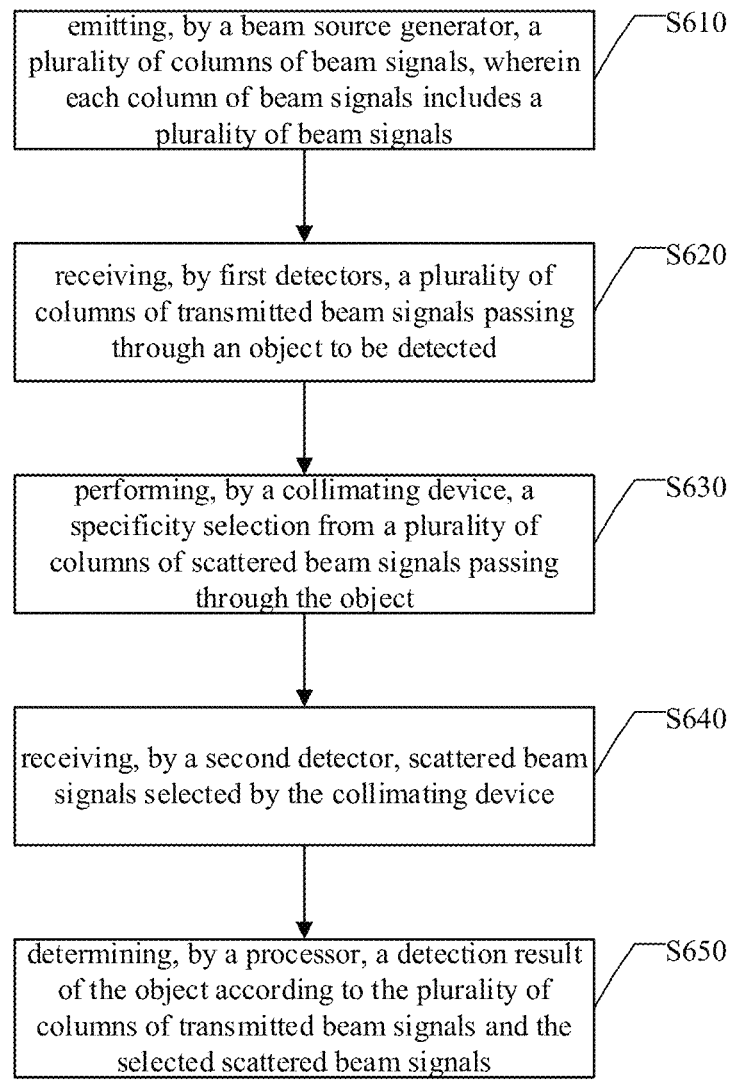
FIG. 6 is a schematic flow chart showing a detection method in embodiments of the present application.

FIG. 6 is a schematic flow chart showing a detection method according to an embodiment of the present application. As shown in FIG. 6, the detection method includes Steps S610-S620.

In the step S610, the beam source generator emits a plurality of columns of beam signals, wherein each column of beam signals includes a plurality of beam signals.

In Step S620, the first detectors receive a plurality of columns of transmitted beam signals passing through an object to be detected.

In Step S630, the collimation device performs a specificity selection from a plurality of columns of scattered beam signals passing through the object.

In Step S640, the second detector receives scattered beam signals selected by the collimating device;

Step S650, the processor determines a detection result of the object according to the plurality of columns of transmitted beam signals and the selected scattered beam signals.

According to the detection method of embodiments of the present application, since a plurality of columns of beam signals are used and the first detectors 120 and the second detectors 130 are alternately arranged in the transmission direction of the object 160, the number of photons collected in a time unit from scattered beam signals is greatly increased, and thus collection efficiency for scattered beam signals is improved.

Other details of the detection method according to embodiments of the present application are similar to those of the detection system according to embodiments of the present application described above with reference to FIG. 1 to FIG. 5, and details are not described herein again.

The above discussed embodiments may be implemented wholly or partly by software, hardware, firmware, or any combination thereof. When implemented in software, it may be implemented wholly or partly in a form of a computer program product or a computer readable storage medium. The computer program product or computer readable storage medium includes one or more computer instructions. When the computer program instructions are loaded and executed on a computer, the processes or functions described in accordance with embodiments of the present application are generated wholly or partly. The computer may be a general purpose computer, a special purpose computer, a computer network, or other programmable devices. The computer instructions may be stored in a computer readable storage medium or transferred from one computer readable storage medium to another computer readable storage medium, for example, the computer instructions may be transferred from a web site, computer, server or signal center to another web site, computer, server, or signal center by wire (e.g., coaxial cables, fiber optics, digital subscriber lines (DSLs), or wireless (e.g., infrared, wireless, microwave, etc.) transmission. The computer readable storage medium may be any available media that can be accessed by a computer or a signal storage device such as a server, signal center, or the like that includes one or more available media. The usable medium may be a magnetic medium, such as a floppy disk, a hard disk, a magnetic tape, an optical medium such as a DVD, or a semiconductor medium such as a Solid State Disk (SSD).

It is to be understood that the application is not limited to the specific configurations and processes described above and illustrated in the drawings. For the sake of brevity, detailed descriptions of known methods have been omitted here. In the above embodiments, several specific steps have been described and illustrated as examples. However, the method of the present application is not limited to the described and illustrated specific steps, and those skilled in the art can make various changes, modifications and additions, or change the order between the steps under the spirit of the present application.

The present application may be embodied in other specific forms without departing from spirit and essential characteristics of the present application. The embodiments should be considered in all aspects as illustrative and not restrictive. The scope of the present application is defined by the appended claims rather the above descriptions, and all changes within the scope limited by features in the claims and equivalents thereof are thus included in the scope of the present application. Also, different technical features that appear in different embodiments can be combined to achieve beneficial effects. Other variations of the disclosed embodiments can be understood and practiced by those skilled in the art after reading the drawings, the description and the claims.

What is claimed is:

1. An X-ray detection system, comprising:
    a beam source generator, first detectors, a second detector, a collimating device, and a processor;
    wherein the first detectors and the second detector are alternately arranged in a transmission direction of an object to be detected; and
    wherein the beam source generator is configured to emit a plurality of columns of beam signals, wherein each column of beam signals comprises a plurality of beam signals;
    the first detectors are configured to receive a plurality of columns of transmitted beam signals passing through the object;
    the collimating device is configured to perform a specificity selection from a plurality of columns of scattered beam signals passing through the object;
    the second detector is configured to receive scattered beam signals selected by the collimating device; and
    the processor is configured to determine a detection result of the object according to the plurality of columns of transmitted beam signals and the selected scattered beam signals;
    wherein the first detectors comprise at least two dual energy transmission detectors.

2. The detection system according to claim 1, wherein emission of the beam signals by the beam source generator is in a positive direction of an X-axis of a three-dimensional Cartesian coordinate system, and the transmission direction of the object is in a Y axis of three-dimensional Cartesian coordinate system.

3. The detection system according to claim 2, wherein an incident plane of the plurality of columns of beam signals is in a YOZ plane, and incident points of the plurality of columns of beam signals on the YOZ plane are in a two-dimensional discrete distribution.

4. The detection system according to claim 3, wherein the incident points of the plurality of columns of beam signals are spaced equally on a Z-axis of the three-dimensional Cartesian coordinate system.

5. The detection system according to claim 4, wherein an interval on the Y-axis is a distance determined based on a transmission speed of the object, exposure time of the first detectors and exposure time of the second detector.

6. The detection system according to claim 4, wherein straight lines formed by the incident points of the plurality of columns of beam signals are in parallel to the Z axis.

7. The detection system according to claim 4, wherein the incident points of the plurality of columns of beam signals are spaced equally on a Y-axis of the three-dimensional Cartesian coordinate system.

8. The detection system according to claim 4, wherein the incident points of the plurality of columns of beam signals are spaced unequally on a Y-axis of the three-dimensional Cartesian coordinate system.

9. The detection system according to claim 1, wherein the second detector comprises: at least one photon counting scatter detector.

10. The detection system according to claim 1, wherein the first detectors are disposed opposite directly to the beam source generator.

11. The detection system according to claim 1, wherein the collimating device comprises a collimator or an encoder plate.

12. The detection system according to claim 11, wherein the collimating device is disposed opposite directly to the second detector.

13. The detection system according to claim 1, wherein the second detector is disposed between two adjacent first detectors.

14. An X-rays detection method, comprising:
  emitting, by a beam source generator, a plurality of columns of beam signals, wherein each column of beam signals includes a plurality of beam signals;
  receiving, by first detectors, a plurality of columns of transmitted beam signals passing through an object to be detected;
  performing, by a collimating device, a specificity selection from a plurality of columns of scattered beam signals passing through the object;
  receiving, by a second detector, scattered beam signals selected by the collimating device; and
  determining, by a processor, a detection result of the object according to the plurality of columns of transmitted beam signals and the selected scattered beam signals;
  wherein the first detectors comprise at least two dual energy transmission detectors.

* * * * *